United States Patent
Li et al.

(10) Patent No.: US 12,008,775 B2
(45) Date of Patent: Jun. 11, 2024

(54) METHOD AND DEVICE FOR IMAGE REGISTRATION, AND COMPUTER PROGRAM PRODUCT

(71) Applicant: GENEMIND BIOSCIENCES COMPANY LIMITED, Shenzhen (CN)

(72) Inventors: Linsen Li, Shenzhen (CN); Weibin Xu, Shenzhen (CN); Huan Jin, Shenzhen (CN); Zefei Jiang, Shenzhen (CN); Zhiliang Zhou, Shenzhen (CN); Qin Yan, Shenzhen (CN)

(73) Assignee: GENEMIND BIOSCIENCES COMPANY LIMITED (CN)

( * ) Notice: Subject to any disclaimer, the term of this patent is extended or adjusted under 35 U.S.C. 154(b) by 606 days.

(21) Appl. No.: 17/270,423

(22) PCT Filed: Aug. 22, 2018

(86) PCT No.: PCT/CN2018/101815
§ 371 (c)(1),
(2) Date: Feb. 22, 2021

(87) PCT Pub. No.: WO2020/037570
PCT Pub. Date: Feb. 27, 2020

(65) Prior Publication Data
US 2021/0217186 A1    Jul. 15, 2021

(51) Int. Cl.
*G06T 7/33* (2017.01)
*G06T 5/20* (2006.01)
(Continued)

(52) U.S. Cl.
CPC ............ *G06T 7/337* (2017.01); *G06T 5/20* (2013.01); *G06T 5/70* (2024.01); *G06T 5/73* (2024.01);
(Continued)

(58) Field of Classification Search
CPC ....... G06T 3/0068; G06T 3/0081; G06T 7/11; G06T 2207/20052; G06T 2207/20221;
(Continued)

(56) References Cited

U.S. PATENT DOCUMENTS 6,301,377 B1 * 10/2001 Taylor, Jr. ................. G06T 7/33
382/129
8,131,476 B2    3/2012 Cline
(Continued)

FOREIGN PATENT DOCUMENTS

CN    101206116 A    6/2008
CN    101930116 A    12/2010
(Continued)

OTHER PUBLICATIONS

Ye Binggang, High-throughput Genome Sequencing Image Processing and Data Analysis, China doctoral dissertation full text database, vol. 11, p. 34-35, 46-49, Nov. 15, 2010.
(Continued)

*Primary Examiner* — Gandhi Thirugnanam
(74) *Attorney, Agent, or Firm* — Dilworth IP, LLC (57) ABSTRACT

A method and device for image registration, and a computer program product. The method includes performing, based on a reference image, a first registration of an image to be registered, including determining a first offset between predetermined areas on the image and the reference image, and moving all bright spots on the image based on the first offset; performing, based on the reference image, a second registration with respect to the first registered image, including merging the first registered image and the reference image, calculating the offset of all overlapped bright spots in the predetermined area on the merged image to determine a second offset, two or more bright spots distanced by less than a predetermined number of pixels being one overlapped
(Continued)

S10 — Performing a first registration for an image to be registered based on a reference image, comprising: determining a first offset between a predetermined region on the image to be registered and a corresponding predetermined region on the reference image, and moving all spots on the image to be registered based on the first offset to give an image to be registered having undergone the first registration S20 — Performing a second registration for the image to be registered having undergone the first registration based on the reference image, comprising: merging the image to be registered having undergone the first registration with the reference image, calculating an offset of all overlap spots in a predetermined region on the merging image, and moving all spots on the image to be registered having undergone the first registration based on the offset to register the image to be registered bright spot, and moving, on the basis of the second offset, all bright spots on the first registered image, thus implementing the registration of the image.

20 Claims, 5 Drawing Sheets

(51) Int. Cl.
    *G06T 5/70*     (2024.01)
    *G06T 5/73*     (2024.01)
    *G06T 7/00*     (2017.01)
    *G06T 7/194*     (2017.01)
    *G06T 7/37*     (2017.01)
    *G06T 7/38*     (2017.01)

(52) U.S. Cl.
    CPC ............ *G06T 7/0012* (2013.01); *G06T 7/194* (2017.01); *G06T 7/37* (2017.01); *G06T 7/38* (2017.01); *G06T 2207/10016* (2013.01); *G06T 2207/10056* (2013.01); *G06T 2207/20056* (2013.01); *G06T 2207/30072* (2013.01)

(58) Field of Classification Search
    CPC ... G06T 7/38; G06T 7/74; G06T 2207/30072; G06T 7/194; G06T 2207/10056; G06T 7/337
    See application file for complete search history.

(56) References Cited

U.S. PATENT DOCUMENTS

| | | |
|---|---|---|
| 8,774,494 B2 | 7/2014 | Staker |
| 8,880,351 B2 | 11/2014 | Can |
| 2004/0101191 A1* | 5/2004 | Seul .................. G06T 7/33 382/128 |
| 2012/0020537 A1* | 1/2012 | Garcia ............... G06T 7/246 382/129 |
| 2014/0349281 A1 | 11/2014 | Jennings |
| 2015/0202618 A1* | 7/2015 | Haga .................. G01N 21/6428 506/16 |
| 2015/0317433 A1 | 11/2015 | Kermani et al. |
| 2017/0011489 A1* | 1/2017 | Van Leeuwen ....... G06T 3/0081 |
| 2017/0309021 A1* | 10/2017 | Barnes ............... G06T 7/0012 |
| 2018/0253871 A1* | 9/2018 | Bredno ............... G06T 7/174 |
| 2021/0217171 A1* | 7/2021 | Li ..................... G06T 5/50 |
| 2021/0217186 A1* | 7/2021 | Li ..................... G06T 5/002 |

FOREIGN PATENT DOCUMENTS

| | | |
|---|---|---|
| CN | 101950419 A | 1/2011 |
| CN | 102174384 A | 9/2011 |
| CN | 102354398 A | 2/2012 |
| CN | 102663720 A | 9/2012 |
| CN | 103582697 A | 2/2014 |
| CN | 104297249 A | 1/2015 |
| CN | 104318568 A | 1/2015 |
| CN | 104376537 A | 2/2015 |
| CN | 105039147 A | 11/2015 |
| CN | 105205788 A | 12/2015 |
| CN | 105303533 A | 2/2016 |
| CN | 105389581 A | 3/2016 |
| CN | 105427327 A | 3/2016 |
| CN | 105524827 A | 4/2016 |
| CN | 105550990 A | 5/2016 |
| CN | 105551034 A | 5/2016 |
| CN | 105741266 A | 7/2016 |
| CN | 106295124 A | 1/2017 |
| CN | 107730541 A | 2/2018 |
| CN | 107918931 A | 4/2018 |
| CN | 107945150 A | 4/2018 |
| CN | 108022259 A | 5/2018 |
| CN | 108192953 A | 6/2018 |
| CN | 108229098 A | 6/2018 |
| EP | 3306566 A1 | 4/2018 |
| JP | 2007315772 A | 12/2007 |
| KR | 101348680 B1 | 1/2014 |
| WO | 2016107896 A1 | 7/2016 |
| WO | 2018068600 A1 | 4/2018 |

OTHER PUBLICATIONS

Julien Ghaye et al, Image Thresholding Techniques for Localization of Sub-Resolution Fluorescent Biomarkers, International Society for Advancement of Cytometry (ISAC), Cytometry Part A, 83A, p. 1001-1016, 2013.

Feng He et al, A Laplacian of Gaussian-Based Approach for Spot Detection in Two-Dimensional Gel Electrophoresis Images, 4th Conference on Computer and Computing Technologies in Agriculture (CCTA), Nanchang, China, 10.1007/978-3-642-18369-0_2. hal-01564853, 9 pages, Oct. 2010.

Ihor Smal, Quantitative Comparison of Spot Detection Methods in Fluorescence Microscopy, IEEE Transactions on Medical Imaging, vol. 29, No. 2, p. 282-301, Feb. 2010.

Kenji Takita et al, High-Accuracy Subpixel Image Registration Based on Phase-Only Correlation, IEICE Trans. Fundamentals, vol. E86-A, No. 8, Aug. 2003.

International Search Report for PCT/CN2019/101815; dated May 20, 2019, 2 pages.

Extended European Search Report for App. No. EP18930564.2, dated Aug. 12, 2021, 9 pages.

* cited by examiner

S01 — Identifying a spot, comprising: detecting spots for an image using k1×k2 matrices, determining that the matrix in which a center pixel value of the matrix is not less than any non-center pixel value of the matrix corresponds to a candidate spot, and determining whether the candidate spot is the spot S10 — Performing a first registration for an image to be registered based on a reference image, comprising: determining a first offset between a predetermined region on the image to be registered and a corresponding predetermined region on the reference image, and moving all spots on the image to be registered based on the first offset to give an image to be registered having undergone the first registration S20 — Performing a second registration for the image to be registered having undergone the first registration based on the reference image, comprising: merging the image to be registered having undergone the first registration with the reference image, calculating an offset of all overlap spots in a predetermined region on the merging image, and moving all spots on the image to be registered having undergone the first registration based on the offset to register the image to be registered

| 1 | 0 | 1 | 0 | 0 |
|---|---|---|---|---|
| 0 | 0 | 1 | 1 | 0 |
| 0 | 1 | 1 | 0 | 1 |
| 1 | 1 | 0 | 1 | 0 |
| 1 | 0 | 0 | 1 | 1 |

METHOD AND DEVICE FOR IMAGE REGISTRATION, AND COMPUTER PROGRAM PRODUCT

TECHNICAL FIELD

The present disclosure relates to the field of image processing, and in particular, to a method for image registration, a device for image registration, and a computer program product with an image registration function.

BACKGROUND

In application involving multiple acquisitions of images from an object or objects at different times, it is generally necessary to correct/register the acquired images, so that changes of the object or objects can be accurately obtained based on the corrected images.

In a nucleic acid sequence determination platform based on acquired images of nucleic acid molecules, it is generally necessary to acquire images of the nucleic acid molecules in the same field of view at different times while moving a hardware, and the sequences of the nucleic acid molecules in the field of view can be determined based on information in a plurality of images, including identified images, acquired at different times. In actual image acquisition, the position of a fixed nucleic acid molecule in the images in the field of view acquired at different times is different due to hardware movement with certain precision, i.e., some error between specified movement and actual movement, and/or changes in morphology of the nucleic acid molecule resulting from changes in environment/system in which the nucleic acid molecule is present, which makes it difficult to directly identify and determine the sequence of the nucleic acid molecule accurately based on the acquired images.

Therefore, it is necessary to further develop or improve the method for correcting a plurality of images acquired from an object or objects at different times.

SUMMARY

The embodiments of the present disclosure are intended to solve at least one of the technical problems existing in the prior art or at least provide an alternative practical solution.

According to one embodiment of the present disclosure, a method for image registration is provided. The method comprises: performing a first registration for an image to be registered based on a reference image, wherein the reference image and the image to be registered correspond to the same object and each comprise a plurality of spots, comprising: determining a first offset between a predetermined region on the image to be registered and a corresponding predetermined region on the reference image, and moving all spots on the image to be registered based on the first offset to give an image to be registered having undergone the first registration; and performing a second registration for the image to be registered having undergone the first registration based on the reference image, comprising: merging the image to be registered having undergone the first registration with the reference image to give a merging image, calculating an offset of all overlapped spots in a predetermined region on the merging image to determine a second offset, two or more spots distanced by less than a predetermined pixel being defined as one overlapped spot, and moving all spots on the image to be registered having undergone the first registration based on the second offset to register the image to be registered.

According to another embodiment of the present disclosure, a device for image registration is provided. The device is configured for implementing the method for image registration in the above embodiment of the present disclosure. The device comprises: a first registration module configured for performing a first registration for an image to be registered based on a reference image, comprising: determining a first offset between a predetermined region on the image to be registered and a corresponding predetermined region on the reference image, and moving all spots on the image to be registered based on the first offset to give an image to be registered having undergone the first registration, wherein the reference image and the image to be registered correspond to the same object and each comprise a plurality of spots; and a second registration module configured for performing a second registration for the image to be registered having undergone the first registration from the first registration module based on the reference image, comprising: merging the image to be registered having undergone the first registration with the reference image to give a merging image, calculating an offset of all overlapped spots in a predetermined region on the merging image to determine a second offset, two or more spots distanced by less than a predetermined pixel being defined as one overlapped spot, and moving all spots on the image to be registered having undergone the first registration based on the second offset to register the image to be registered.

According to still another embodiment of the present disclosure, a computer-readable storage medium for storing a program for execution by a computer is provided, wherein the execution of the program comprises implementing the method for image registration in any of the aforementioned embodiments. The computer-readable storage medium includes, but is not limited to, read-only memories, random access memories, magnetic disks, optical disks, or the like.

According to one embodiment of the present disclosure, a terminal, a computer program product comprising an instruction, is also provided, wherein the instruction causes a computer to execute all or a part of the steps of the method for image registration in any of the aforementioned embodiments of the present disclosure when the program is executed by the computer.

The method for image registration, the device for image registration and/or the terminal/computer program product for implementing image registration in the aforementioned embodiments of the present disclosure enable high-precision image correction, and are particularly suitable for scenarios where high-precision image correction is required.

The additional aspects and advantages of the embodiments of the present disclosure will be partially set forth in the following description, and will partially become apparent from the following description or be appreciated by practice of the embodiments of the present disclosure.

DETAILED DESCRIPTION

The embodiments of the present disclosure are described in detail below, and the examples of the embodiments are shown in the accompanying drawings, throughout which identical or similar reference numerals represent identical or similar elements or elements having identical or similar functions. The embodiments described below by reference to the accompanying drawings are exemplary and are merely intended to illustrate the present disclosure, but should not be construed as limiting the present disclosure. In the description of the present disclosure, the terms "first" and "second" are used for description purpose only rather than construed as indicating or implying relative importance or implicitly indicating the number or sequence of indicated technical features. In the description of the present disclosure, unless otherwise specifically defined, "a plurality of" means two or more than two.

Figure 1:
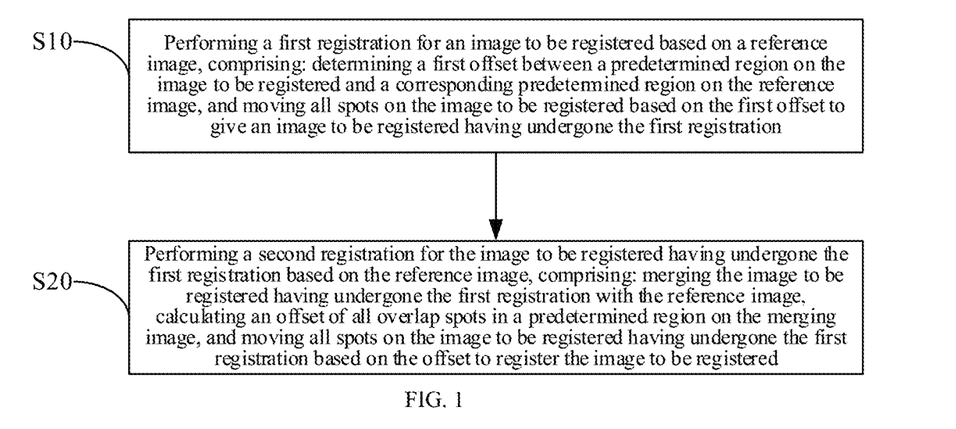
FIG. 1 is a schematic flowchart of a method for image registration according to a specific embodiment of the present disclosure.

One embodiment of the present disclosure provides a method for image registration, i.e., a method for image correction. As shown in FIG. 1, the method comprises: S10, performing a first registration for an image to be registered based on a reference image, wherein the reference image and the image to be registered correspond to the same object and each comprise a plurality of spots, comprising: determining a first offset between a predetermined region on the image to be registered and a corresponding predetermined region on the reference image, and moving all spots on the image to be registered based on the first offset to give an image to be registered having undergone the first registration; and S20, performing a second registration for the image to be registered having undergone the first registration based on the reference image, comprising: merging the image to be registered having undergone the first registration with the reference image to give a merging image, calculating an offset of all overlapped spots in a predetermined region on the merging image to determine a second offset, two or more spots distanced by less than a predetermined pixel being defined as one overlapped spot, and moving all spots on the image to be registered having undergone the first registration based on the second offset to register the image to be registered. The method, through two associated registrations which can be relatively referred to as coarse registration and fine registration including fine registration using spots on an image, can quickly complete high-precision image correction based on a small amount of data, and is particularly suitable for scenarios where high-precision image correction is required, e.g., detection of images at the single molecule level, such as images acquired from a sequencing reaction on a third generation sequencing platform. The single molecule level means that resolution is the size of a single molecule or a few molecules, such as less than 10, 8, 5, 4 or 3 molecules.

The "spot" or "peak" is a luminous point on an image, and a luminous point occupies at least one pixel. The "pixel point" is the same as "pixel".

In some specific embodiments, the image to be registered is acquired from a sequencing platform which performs sequencing based on principles of optical imaging. Sequencing (also referred to as sequence determination) refers to nucleic acid sequencing, including DNA sequencing and/or RNA sequencing, and including long fragment sequencing and/or short fragment sequencing. The biochemical reactions for sequencing include base extensions. Sequencing can be performed through a sequencing platform, which may be selected from, but is not limited to, the Hisq/Miseq/Nextseq sequencing platform (Illumina), the Ion Torrent platform (Thermo Fisher/Life Technologies), the BGISEQ platform (BGI) and single-molecule sequencing platforms. The sequencing method may be selected from single-read sequencing and paired-end sequencing. The obtained sequencing results/data (i.e., read fragments) are referred to as reads, the length of which is referred to as read length. The "spot" corresponds to the optical signal of an extended base or base cluster.

The predetermined region on an image may be all or part of the image. In one example, the predetermined region on an image is part of the image, e.g., a 512×512 region at a center of the image. The center of the image is the center of the field of view. The point of intersection between the optical axis of the imaging system and the imaging plane may be referred to as a central point of the image, and a region centered on the central point may be regarded as a central area of the image.

In some specific embodiments, the image to be registered is acquired from a nucleic acid sequencing platform, which comprises an imaging system and a nucleic acid sample carrier system. The target nucleic acid molecules with optically detectable label are immobilized in a reactor, which is also referred to as a flowcell. The flowcell is fixed on a movable carrier, and is driven by the movable carrier to acquire images of the target nucleic acid molecules at different positions (different fields of view) in the flowcell. In general, precision limitations exist in the movement of the optical system and/or the movable carrier. For example, there may be a deviation between an arrival position specified by an instruction and a position at which the mechanical structure actually arrives, particularly in application scenarios requiring high precision. Therefore, in the process of moving hardware according to an instruction to perform multiple image acquisitions on the same position (field of view) at different time points, it is difficult to completely align the images of the same field of view acquired at the different time points. Correcting and aligning these images can help to accurately determine the nucleotide sequence of a nucleic acid molecule according to the change of information in the images acquired at multiple time points.

In some specific embodiments, the reference image is acquired by construction, and can be constructed when registration is performed for the image to be registered, or can be called when needed after being constructed and stored in advance.

In some examples, constructing a reference image comprises: acquiring a first image and a second image corresponding to the same object as the image to be registered; performing a coarse registration for the second image based on the first image, comprising: determining an offset between the second image and the first image, and moving the second image based on the offset to give a second image having undergone the coarse registration; and merging the first image with the second image having undergone the coarse registration to give the reference image, wherein the first image and the second image each comprise a plurality of spots. As such, an image containing more or relatively more complete information is acquired by construction and used as a basis for correction, which can facilitate more accurate image registration. For images acquired by nucleic acid sequence determination, constructing a reference image using multiple images helps to provide complete spot information corresponding to the nucleic acid molecule using the reference image, and is favorable for image correction based on spots.

In some embodiments, the first image and the second image are acquired at different times from the same field of view of a nucleic acid sequence determination reaction (sequencing reaction). Here, one extension of A, T/U, G and C bases is defined as one sequencing reaction. In one example, one sequencing reaction comprises a plurality of base extension reactions, such as one-color sequencing in which substrates (nucleotide analogues) corresponding to four bases used contain the same fluorescent dye. One sequencing reaction comprises four base extension reactions (4 repeats). For a field of view, one base extension reaction involves one image acquisition, with the first image and the second image being acquired from the same field of view of different base extension reactions. As such, the reference image obtained by processing and collecting information about the first image and the second image is used as a basis for correction, which can facilitate more accurate image correction.

In another example, two of the substrates (nucleotide analogues) corresponding to four bases used in a single-molecule two-color sequencing reaction contain a fluorescent dye and the other two substrates contain another fluorescent dye with a different excitation wavelength. One sequencing reaction comprises two base extension reactions, and the two base substrates with different dyes are subjected to a binding reaction in a base extension reaction. For a field of view, one base extension reaction involves two image acquisitions at different excitation wavelengths, with the first image and the second image being acquired from the same field of view of different base extension reactions or the same field of view at different excitation wavelengths of the same base extension reaction. As such, the reference image obtained by processing and collecting information about the first image and the second image is used as a basis for correction, which can facilitate more accurate image correction.

In still another example, one sequencing reaction comprises one base extension reaction, such as a two-color sequencing reaction on a second generation sequencing platform, in which substrates (such as nucleotide analogues) corresponding to four bases contain dye a, dye b, dye a and dye b, and no dye, respectively, with the dye a and the dye b having different excitation wavelengths. The four substrates enable one sequencing reaction in the same base extension reaction, with the first image and the second image being acquired from the same field of view of different sequencing reactions or the same field of view at different excitation wavelengths of the same sequencing reaction. As such, the reference image obtained by processing and collecting information about the first image and the second image is used as a basis for correction, which can facilitate more accurate image correction.

The first image and/or the second image may be either one image or a plurality of images. Further, in some specific embodiments, constructing the reference image further comprises utilizing a third image and a fourth image, wherein the image to be registered, the first image, the second image, the third image and the fourth image are acquired from the same field of view of a sequencing reaction, the first image, the second image, the third image and the fourth image respectively corresponding to fields of view during the extension reactions of the four bases A, T/U, G and C. A plurality of nucleic acid molecules with an optically detectable label are present in this field of view during the extension reactions of the bases, and at least part of the nucleic acid molecules are present as spots on the image. Constructing the reference image further comprises: performing a coarse registration for the third image based on the first image, comprising: determining an offset between the third image and the first image, and moving the third image based on the offset to give a third image having undergone the coarse registration; performing a coarse registration for the fourth image based on the first image, comprising: determining an offset between the fourth image and the first image, and moving the fourth image based on the offset to give a fourth image having undergone the coarse registration; and merging the first image with the second image having undergone the coarse registration, the third image having undergone the coarse registration and the fourth image having undergone the coarse registration to give the reference image.

In S10, there is no limitation on how the first registration is implemented. For example, Fourier transform can be used to determine the first offset by frequency domain registration. Specifically, for example, the first offset, the offset between the second image and the first image, the offset between the third image and the first image and/or the offset between the fourth image and the first image can be determined by referring to two-dimensional discrete Fourier transform in phase-only correlation function in Kenji TAKITA et al., IEICE TRANS. FUNDAMENTALS, VOL. E86-A, NO. 8 Aug. 2003. The first registration/coarse registration can reach a precision of 1 pixel. Thus, the first offset can be quickly and accurately determined and/or a reference image that facilitates precise correction can be constructed.

In some specific embodiments, the reference image and the image to be registered are binary images, which facilitates reduction of operation and quick correction.

In one example, both the image to be corrected and the reference image are binary images (i.e., each pixel in the images is either a or b, e.g., a is 1, and b is 0), and pixels labeled 1 are brighter or more intense than pixels labeled 0. Here, the extension of nucleic acid molecules by one base or a type of base in the nucleic acid sequencing process is defined as a cycle. The reference image is constructed using cycle1-cycle4 images, and the first image and the second image are selected from any one, two or three of the cycle1-cycle4 images.

In one example, the first image is a eyelet image, and cycle2-4 images are the second image. The cycle2-4 images are subjected to a coarse registration successively based on the eyelet image to give cycle2-4 images having undergone the coarse registration respectively, and then the eyelet image is merged with the cycle2-4 images having undergone the coarse registration to give a reference image. The merging image is an overlapped spot on the merging image. Based primarily on the size of spots of the corresponding nucleic acid molecules and the resolution of an imaging system, in one example, two spots distanced by no more than 1.5 pixels on two images are set as an overlapped spot. Here, the central area of a composite image from images of 4 cycles is used as a reference image, which allows the reference image to have enough spots for subsequent registration, and allows information about spots in the detected and located center area to be relatively more accurate for accurate registration.

Figure 2:
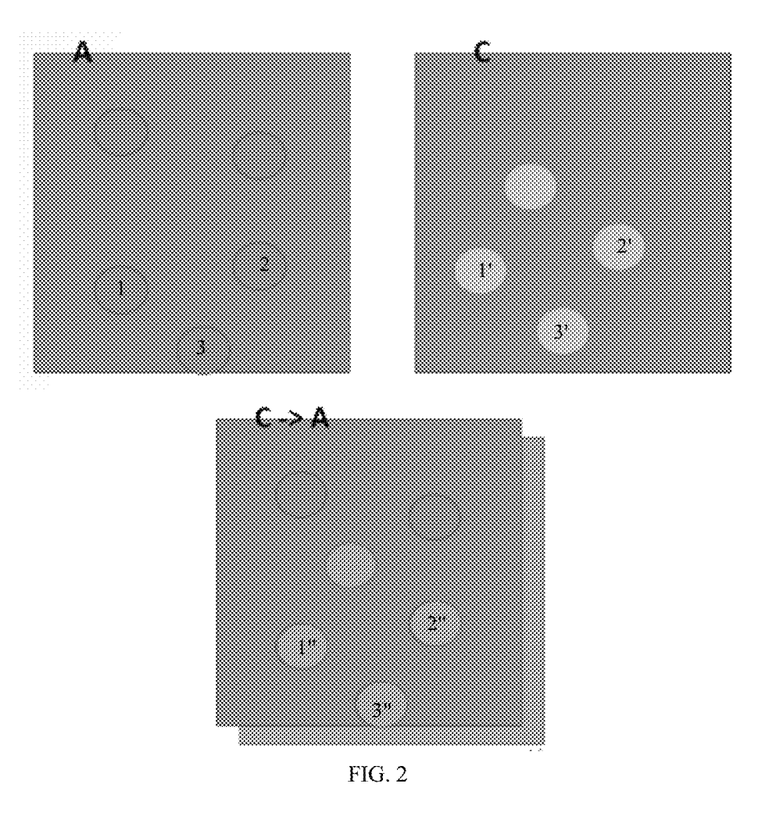
FIG. 2 is a schematic of an image correction process and a correction result according to a specific embodiment of the present disclosure.

In one example, the steps below are followed for image correction: 1) performing a coarse correction for a cycle5 image acquired from a field of view of a cycle5 reaction, wherein the cycle5 image is a binarized image, the central area such as 512×512 area of the image and a central area of composite image from cycle1-cycle4 images (an 512×512 area at the center of the corresponding reference image) are subjected to two-dimensional discrete Fourier transform to give an offset (x0,y0) by frequency domain registration, that is, to complete coarse image registration, with x0 and y0 reaching an precision of 1 pixel; 2) merging the image having undergone the coarse registration with the reference image based on spots on the images, comprising: calculating an offset (x1,y1) of the overlapped spots in the central area of the cycle5 image and the corresponding area of the reference image according to the equation offset (x1,y1)=coordinate position of the spot on the image to be corrected—coordinate position of the corresponding spot on the reference image, which can be expressed as offset (x1,y1)=curCyclePoints−basePoints; and calculating an average offset of all overlapped spots to give the fine offset ranging from [0,0] to [1,1]. In one example, two spots distanced by no more than 1.5 pixels on two images are set as one overlapped spot. 3) To sum up, an offset (x0,y0)-(x1,y1) for different cycles in a field of view (fov) is obtained, which for a spot (peak) can be expressed as: curCyclePoints+(x0,y0)-(x1,y1), where curCyclePoints represents the original coordinates of the spot, that is, coordinates in the image before correction. The correction results from the above image correction have high accuracy, and the correction precision is less than or equal to 0.1 pixel. FIG. 2 illustrates the correction process and results. In FIG. 2, an image C is corrected based on an image A, circles in the images A and C represent spots, and spots with the same numerical symbols are overlapped spots, and image C→A represents the correction result, that is, the result of aligning the image C to the image A.

Figure 3:
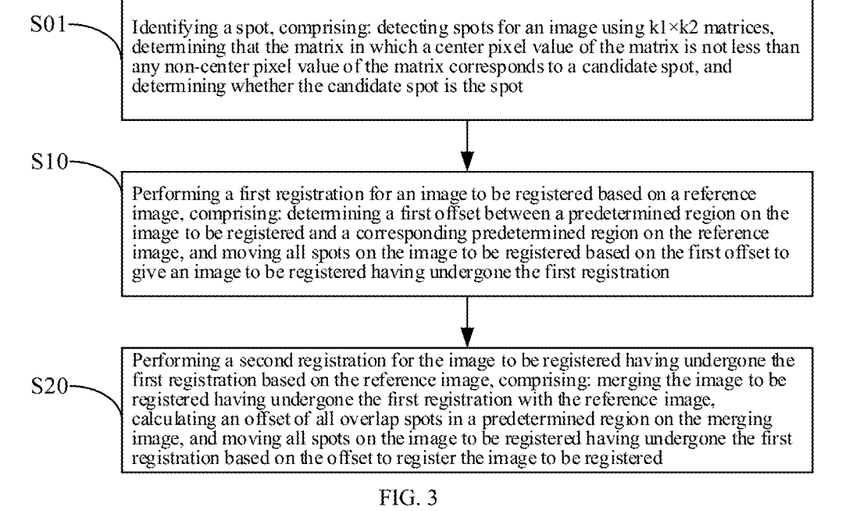
FIG. 3 is a schematic flowchart of a method for image registration according to a specific embodiment of the present disclosure.

In some specific embodiments, as shown in FIG. 3, the method for image registration further comprises S01, identifying a spot, comprising: detecting spots for an image using k1×k2 matrices, determining that the matrix in which a center pixel value of the matrix is not less than any non-center pixel value of the matrix corresponds to a candidate spot, and determining whether the candidate spot is the spot, wherein both k1 and k2 are odd numbers greater than 1, and the matrix k1×k2 comprises k1×k2 pixels. The image is selected from at least one of the image to be registered and the images for constructing the reference image. Spots (or peaks) on an image (particularly an image acquired from a nucleic acid sequence determination reaction) can be detected quickly and effectively by this method. There is no special limitation on the image to be detected, or original input data. The method is applicable to processing and analysis of any images generated by a nucleic acid sequencing platform based on optical detection, including but not limited to second- and third-generation sequencing, and features high accuracy and high efficiency and more information about the sequence acquired from the image. Specifically, for a random image and signal identification requiring high accuracy, the method has special advantages.

In some embodiments, the image is acquired from a nucleic acid sequence determination reaction, and nucleic acid molecules have optically detectable labels, e.g. fluorescent labels. The fluorescent molecules can be excited under the irradiation of laser with a specific wavelength to emit fluorescence, and the image is acquired by the imaging system. The acquired image contains peaks/spots which may correspond to the positions of the fluorescent molecules. It can be understood that at a focal plane position, the spots corresponding to the positions of the fluorescent molecules in the acquired image are smaller and brighter; and at a non-focal plane position, the spots corresponding to the positions of the fluorescent molecules in the acquired image are larger and darker. In addition, other substances/information which are not targeted or are hard to utilize later, such as impurities, may exist in a field of view; and further, as the field of view of a single molecule is photographed, a large number of molecule aggregates (clusters) will also interfere with the acquisition of target single molecule information. The single molecule is a few molecules, for example, the number of molecules is not greater than 10, e.g., 1, 2, 3, 4, 5, 6, 8 or 10.

In some examples, the center pixel value of the matrix is greater than a first preset value, any non-center pixel value of the matrix is greater than a second preset value, and the first preset value and the second preset value are related to an average pixel value of the image.

In some embodiments, the k1×k2 matrix can be used to perform traversal detection on the image, and the setting of the first preset value and/or the second preset value is related to the average pixel value of the image. For a grayscale image, the pixel value refers to the grayscale value. In the k1×k2 matrix, k1 and k2 may or may not be equal. In one example, related parameters of an imaging system includes: a 60× magnification for an objective lens, a size of 6.5 lam for an electronic sensor, the smallest identifiable size of 0.1 lam for a microscopic image acquired by the electronic sensor, a 16-bit grayscale or color image of 512×512, 1024×1024 or 2048×2048 for an output or input image, and a range of greater than 1 to less than 10 for k1 and k2. In one example, k1=k2=3; and in another example, k1=k2=5. For a color image having three pixel values for each pixel, the color image may be converted into a grayscale image before detecting the spots, so as to reduce the calculation and complexity in an image detection process. A non-grayscale image may be converted into a grayscale image with methods including but not limited to floating point algorithm, integer method, shift method, mean value method, etc.

In one example, based on a large number of image processing statistics, the first preset value is set as 1.4 times the average pixel value of the image, the second preset value is set as 1.1 times the average pixel value of the image, and thereby, interference can be eliminated and a spot detection result can be obtained from optically detectable labels.

Candidate spots can be further screened and determined by size, degree of similarity with an ideal spot, and/or intensity. In some specific embodiments, the size of a candidate spot on the image is quantitatively reflected and compared by the size of connected component corresponding to the candidate spot, so as to screen and determine whether the candidate spot is a spot needed.

In one example, determining whether a candidate spot is a spot comprises: calculating the size of a connected component corresponding to a candidate spot according to the equation Area=A×B, and determining the candidate spot with the size of corresponding connected component greater than a third preset value as the spot, wherein A represents the size of the pixel connectivity in a row where the center of a matrix corresponding to the candidate spot is located, B represents the size of the pixel connectivity in a column where the center of the matrix corresponding to the candidate spot is located, and a pixel connectivity in the k1×k2 matrix which is greater than an average pixel value is defined as the connected component corresponding to the candidate spot. As such, spots which correspond to labeled molecules and are applicable for subsequent sequence identification can be effectively obtained, so that nucleic acid sequence information can be obtained.

Figure 4:
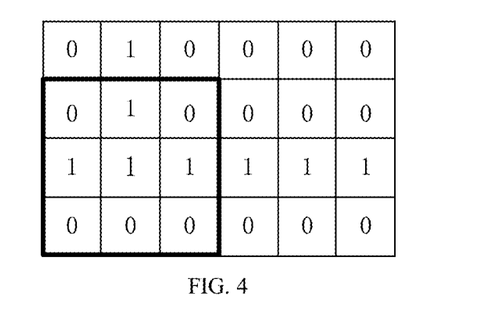
FIG. 4 is a schematic of a matrix corresponding to a candidate spot and pixel connectivity according to a specific embodiment of the present disclosure.

In one example, based on the average pixel value of the image, two or more adjacent pixels which are not less than the average pixel value is the pixel connectivity. As shown in FIG. 4, the bold and enlarged part represents the center of the matrix corresponding to the candidate spot; the thick frame represents the 3×3 matrix corresponding to the candidate spot; the pixels marked as 1 are pixels which are not less than the average pixel value of the image; and the pixels marked as 0 are pixels which are less than the average pixel value. It can be seen that A=3 and B=6, so the size of the connected component corresponding to the candidate spot is A×B=3×6.

The third preset value can be determined according to the sizes of connected components corresponding to all the candidate spots on the image. For example, by calculating the size of a connected component corresponding to each candidate spot on the image, the average size of the connected components corresponding to the spots, which represents a feature of the image, is taken as a third preset value. For another example, the sizes of the connected components corresponding to the candidate spots on the image can be sorted in ascending order, and the size of the connected component at the 50th, 60th, 70th, 80th or 90th quantile is taken as the third preset value. As such, spot information can be obtained effectively, which is favorable for subsequent nucleic acid sequence identification.

In some examples, the intensities of candidate spots are quantitatively reflected and compared by statistically analyzing setting parameters, so as to screen the candidate spots. In one example, determining whether a candidate spot is a spot comprises: calculating score of a candidate spot according to the equation Score=((k1×k2−1)CV−EV)/((CV+EV)/(k1×k2)), and determining the candidate spot with the score greater than a fourth preset value as the spot, wherein CV represents the center pixel value of a matrix corresponding to the candidate spot, and EV represents the sum of non-center pixel values of the matrix corresponding to the spot. As such, spots which correspond to labeled molecules and are applicable for subsequent sequence identification can be effectively obtained, so that nucleic acid sequence information can be obtained.

The fourth preset value can be determined according to the scores of all the candidate spots on the image. For example, when the number of the candidate spots on the image is greater than a certain number which meets a statistic requirement for quantity, for example, the number of the candidate spots on the image is greater than 30, the scores of all the candidate spots of the image can be calculated and sorted in ascending order, and the fourth preset value can be set as a score at the 50th, 60th, 70th, 80th or 90th quantile. As such, the candidate spots with scores less than the score at the 50th, 60th, 70th, 80th or 90th quantile can be discarded, so that target spots can be obtained effectively, which is favorable for subsequent accurate base sequence identification. The basis of this processing or screening setting is that generally a concentrated spot with great difference in intensity/pixel value between the center and the edge is considered to be a spot corresponding to the position of a molecule to be detected. In general, the number of candidate spots on an image is greater than 50, 100 or 1000.

In some examples, candidate spots are screened according to morphology and intensity/brightness. In one example, determining whether a candidate spot is a spot comprises: calculating the size of a connected component corresponding to a candidate spot according to the equation Area=A×B, and calculating the score of the candidate spot according to the equation Score=((k1×k2−1)CV−EV)/((CV+EV)/(k1*k2)), wherein A represents the size of the pixel connectivity in a row where the center of a matrix corresponding to the candidate spot is located, B represents the size of the pixel connectivity in a column where the center of the matrix corresponding to the candidate spot is located, a pixel connectivity in the k1×k2 matrix which is greater than an average pixel value is defined as the connected component corresponding to the candidate spot, CV represents the center pixel value of a matrix corresponding to the candidate spot, and EV represents the sum of non-center pixel values of the matrix corresponding to the spot; and determining the candidate spot with the size of corresponding connected component greater than a third preset value and the score greater than a fourth present value as the spot. As such, spot information which corresponds to nucleic acid molecules and is favorable for subsequent sequence identification can be obtained effectively. The third preset value and/or the fourth preset value can be considered and set by reference to aforementioned specific embodiments.

Figure 5:
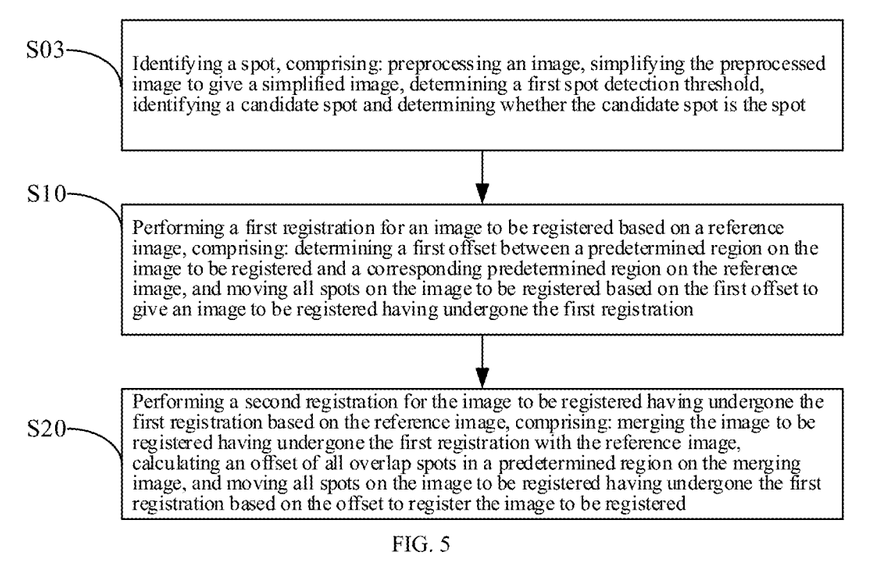
FIG. 5 is a schematic flowchart of a method for image registration according to a specific embodiment of the present disclosure.

In some specific embodiments, as shown in FIG. 5, the method for image registration further comprises S03, identifying a spot, wherein the image to be registered and/or the reference image is acquired from a field of view of extension reactions of bases. A plurality of nucleic acid molecules with an optically detectable label are present in this field of view during the extension reactions of the bases, and at least part of the nucleic acid molecules are present as spots on the image. S03 comprises: preprocessing the image to give a preprocessed image, wherein the image is selected from at least one of the image to be registered and images for constructing the reference image; determining a critical value to simplify the preprocessed image so as to give a simplified image, comprising: assigning a first preset value to a pixel value of a pixel on the preprocessed image less than the critical value, and assigning a second preset value to a pixel value of a pixel on the preprocessed image not less than the critical value; determining a first spot detection threshold c1 based on the preprocessed image; identifying a candidate spot on the image based on the preprocessed image and the simplified image, comprising: determining a pixel matrix fulfilling at least two of the following conditions a)-c) as the candidate spot: a) in the preprocessed image, the center pixel of the pixel matrix has the maximum pixel value, the pixel matrix is represented by r1×r2, both r1 and r2 are odd numbers greater than 1, and the pixel matrix r1×r2 comprises r1×r2 pixels, b) in the simplified image, the pixel value of the center pixel of the pixel matrix is the second preset value, and the pixel connectivity in the pixel matrix is greater than $$\frac{2}{3} \times r1 \times r2,$$

and c) in the preprocessed image, the pixel value of the center pixel of the pixel matrix is greater than a third preset value, $g1 \times g2$ is $>c1$, $g1$ is a correlation coefficient of two-dimensional Gaussian distribution in an area of $m1 \times m2$ centered on the center pixel of the pixel matrix, $g2$ is a pixel matrix in the area of $m1 \times m2$, both $m1$ and $m2$ are odd numbers greater than 1, and the area of $m1 \times m2$ comprises $m1 \times m2$ pixels; and determining whether the candidate spot is the spot. Spots on an image (particularly an image acquired from a nucleic acid sequence determination reaction) can be detected quickly and effectively by this method, including using determining conditions or the combination thereof determined by a large amount of data training. There is no special limitation on the image to be detected, or original input data. The method is applicable to processing and analysis of any images generated by a nucleic acid sequencing platform based on optical detection, including but not limited to second- and third-generation sequencing, and features high accuracy and high efficiency and more information about the sequence acquired from the image. Specifically, for a random image and signal identification requiring high accuracy, the method has special advantages.

For a grayscale image, the pixel value refers to the grayscale value. For a color image having three pixel values for each pixel, the color image may be converted into a grayscale image before detecting the spots, so as to reduce the calculation and complexity in an image detection process. A non-grayscale image may be converted into a grayscale image with methods including but not limited to floating point algorithm, integer method, shift method, mean value method, etc.

In some embodiments, preprocessing the image comprises: determining a background of the image using opening operation; converting the image into a first image based on the background using top-hat operation; performing Gaussian blur on the first image to give a second image; and sharpening the second image to give the preprocessed image. In this way, noise of the image can be effectively reduced or the signal-to-noise ratio of the image can be improved, which helps to accurately detect a spot.

Opening operation is a morphological process, and specifically, a process of sequential expansion and corrosion. The corrosion reduces the foreground (a portion of interest), and the expansion enlarges the foreground. The opening operation can be used to eliminate small objects, separate objects at a fine point, and smooth the boundary of a large object without significantly changing its area. In this embodiment, the size of a structural element $p1 \times p2$ (a basic template used to process the image) for opening operation on the image is not specifically defined, and $p1$ and $p2$ are odd numbers. In one example, the structural element $p1 \times p2$ may be $15 \times 15$, $31 \times 31$, or the like, and finally a preprocessed image that is beneficial for subsequent processing and analysis can be obtained.

The top-hat operation is usually used to separate plaques that are brighter than neighboring points (peaks/spots). When an image has a large area of background and regular small items, the background may be extracted using top-hat operation. In one example, the top-hat transformation of an image comprises: performing the opening operation on the image, and subtracting the opening operation result from the original image to give a first image, i.e., the image given by the top-hat transformation. The mathematical expression of the top-hat transformation is $dst=tophat(src,element)=src-open(src,element)$. The inventor believes that, the opening operation may enlarge cracks or blocks of low brightness. Therefore, subtracting opening operation result from the original image may highlight blocks brighter than surrounding blocks in the original image. The operation is related to the size of a selected kernel, in other words, related to an expected size of the peak/spot. If the peak has an unexpected size, the processing may lead to many small bumps on the whole image, a specific example of which may be a defocused image, i.e. messed and blurred peaks/spots. In one example, the expected size of the peak, or the size of the kernel, is $3 \times 3$, and the image acquired from the top-hat transformation is conducive to subsequent denoising process.

Gaussian blur, also referred to as Gaussian filter, is a linear smoothing filter applicable for eliminating Gaussian noise, and is widely used in denoising of image processing. Generally speaking, the Gaussian filter is a process of weighted averaging on the whole image. A value of each pixel is a weighted average of the value itself and other pixel values in neighborhood. The specific procedure of the Gaussian filter is: scanning each pixel in the image using a template (also referred to as convolution or mask), and replacing the value of the center pixel of the template with a weighted average grayscale value of pixels in neighborhood determined using the template. In one example, the Gaussian blur is performed on the first image using GaussianBlur function in OpenCV. The Gaussian distribution parameter Sigma is 0.9, and the two-dimensional filter matrix (convolution kernel) used is $3 \times 3$. From a perspective of an image, after the Gaussian blur, the small bumps on the first image are smoothed, and edges of the image are smooth. Further, the second image, or the image acquired from the Gaussian filter, is sharpened, for example, by two-dimensional Laplacian sharpening. From a perspective of an image, edges are sharpened after processing, and the image acquired from the Gaussian blur is restored.

In some embodiments, simplifying the preprocessed image comprises: determining a critical value based on the background and the preprocessed image; and comparing pixel values of pixels on the preprocessed image with the critical value so as to give a simplified image, comprising: assigning a first preset value to pixel values of the pixels on the preprocessed image less than the critical value and assigning a second preset value to the pixel values of the pixels on the preprocessed image not less than the critical value. As such, according to the critical value determining manner and the critical value determined by summarizing a large amount of data, the preprocessed image is simplified, for example, by binarization, which may facilitate subsequent accurate spot detection, accurate base identification, high-quality data acquisition, and the like.

Specifically, in some examples, acquiring a simplified image comprises: dividing the sharpening result obtained after preprocessing by an opening operation result to give a set of values corresponding to the pixels of the image; and determining a critical value of the pre-binarized image through this set of values. For example, the set of values may be sorted in ascending order, and the value at the 20th, 30th or 40th percentile in the set of values may serve as the binarization critical value/threshold. As such, the binary image may facilitate subsequent accurate detection and identification of spots.

In one example, the structural element for opening operation of image preprocessing is $p1 \times p2$, and the preprocessed image (the sharpening result) is divided by the opening operation result to give a set of arrays/matrices $p1 \times p2$ of the same size as the structural element. The $p1 \times p2$ values comprised in each array are sorted in ascending order, and the 30th percentile in the array serves as the binarization critical value/threshold of the block (numerical matrix). As such, a threshold is determined for binarization in each block of the image, and the final binarization result highlights required information while denoising, which facilitate subsequent accurate detection of spots.

In some examples, a first spot detection threshold is determined by Otsu's method. The Otsu's method (Otsu's algorithm) can also be referred to as a method of maximum inter-class variance that maximizes the inter-class variance to segment an image, which indicates fewer segmentation errors and high accuracy. It is assumed that the segmentation threshold of the foreground and the background of the preprocessed image is T(c1), the proportion of pixels in the foreground to the whole image is $w_0$ with the average grayscale value being $\mu_0$, and the proportion of pixels in the background to the whole image is $w_1$ with the average grayscale value being $\mu_1$. The overall average grayscale value of the image to be processed is denoted as $\mu$, and the inter-class variance is denoted as var, which are: $\mu=\omega_0*\mu_0+\omega_1*\mu_1$; $var=\omega_0(\mu_0-\mu)^2+\mu_1(\mu_1-\mu)^2$. The latter is substituted into the former, getting the following equation: $val=\omega_0\omega_1(\mu_1-\mu_0)^2$. The segmentation threshold T that maximizes the inter-class variance is acquired by a traversal method, and it is the required first spot detection threshold c1.

In some embodiments, identifying a candidate spot on the image based on the preprocessed image and the simplified image comprises determining a pixel matrix fulfilling at least two of the conditions a)-c) as the candidate spot. As such, the accuracy of subsequent nucleic acid sequencing based on spot information and the quality of reads may be effectively improved.

Specifically, in one example, conditions required for determining a candidate spot include a), wherein k1 and k2 may or may not be equal. In one example, related parameters of an imaging system includes: a 60× magnification for an objective lens, a size of 6.5 lam for an electronic sensor, the smallest identifiable size of 0.1 lam for a microscopic image acquired by the electronic sensor, a 16-bit grayscale or color image of 512×512, 1024×1024 or 2048×2048 for an output or input image, and a range of greater than 1 to less than 10 for k1 and k2. In one example, in a preprocessed image, k1 and k2 are set at 3 according to the expected size of spot; and in another example, k1 and k2 are set at 5.

In one example, conditions required for determining a candidate spot include b), namely in the simplified image, the pixel value of the center pixel of the pixel matrix is the second preset value, and the pixel connectivity of the pixel matrix is greater than $$\frac{2}{3} \times k1 \times k2,$$

i.e., the pixel value of the center pixel is greater than the critical value, and the pixel connectivity is greater than two thirds of the matrix. Here, two or more pixels with adjacent pixel values equal to the second preset value are the pixel connectivity. For example, the simplified image is a binary image, the first preset value is 0, and the second preset value is 1. As shown in FIG. 4, the bold and enlarged part represents the center of a pixel matrix, and the thick frame represents the pixel matrix 3×3, that is, k1=k2=3. The pixel value of the center pixel of the matrix is 1, the pixel connectivity is 4, which is less than $$\frac{2}{3} \times k1 \times k2 = 6,$$

and therefore the pixel matrix does not meet the condition b), and is not a candidate spot.

Figure 6:
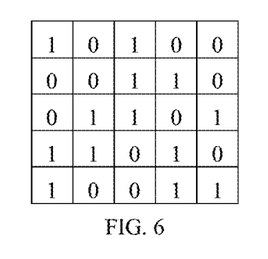
FIG. 6 is a schematic of pixel values in an area of m1×m2 centered on a center pixel of a pixel matrix according to a specific embodiment of the present disclosure.

In one example, conditions required for determining a candidate spot include c), wherein in the preprocessed image, g2 is a corrected pixel matrix in the area of m1×m2, e.g., a sum of corrected pixels in the area of m1×m2. In one example, correction is performed according to the proportion of the pixels with pixel values equal to the second present value in the corresponding area of m1×m2 in the simplified image. For example, as shown in FIG. 6, m1=m2=5, the proportion of the pixels with pixel values equal to the second present value in the corresponding area of m1×m2 in the simplified image is 13/25 (13 "1"s), and corrected g2 is 13/25 of original g2. As such, it facilitates accuracy of the spot detection and identification, and subsequent analysis and interpretation of spot information.

In some examples, determining whether a candidate spot is a spot also comprises: determining a second spot detection threshold based on the preprocessed image, and determining a candidate spot with a pixel value not less than the second spot detection threshold as a spot. In one specific example, a pixel value of a pixel to which the coordinates of the candidate spot correspond is assigned to the pixel value of the candidate spot. After the candidate spots are further screened using the second spot detection threshold determined based on the preprocessed image, at least a part of spots that are more likely the image background but are similar to "spots" in brightness (intensity) and/or shape may be excluded, which helps to accurately identify a sequence based on the spot, and improves quality of reads.

In one example, the coordinates of the candidate spot, including sub-pixel coordinates, may be given by centroid method. The grayscale value of the coordinates of the candidate spot is calculated by bilinear interpolation.

In some specific examples, determining whether a candidate spot is a spot comprises: dividing the preprocessed image into a set of blocks of a predetermined size, and sorting the pixel values of pixels in the block to determine the second spot detection threshold corresponding to the block; and determining a candidate spot in the block with a pixel value not less than the second spot detection threshold corresponding to the block as a spot. As such, a difference between different blocks of the image such as an overall difference of light intensity is distinguished, and each spot is further detected and identified, so as to help to accurately identify the spot and find more spots.

When dividing the preprocessed image into a set of block of a predetermined size, the blocks may or may not overlap with each other. In one example, the blocks do not overlap with each other. In some embodiments, the size of the preprocessed image is not less than 512×512, such as 512×512, 1024×1024, 1800×1800, or 2056×2056, and the block of the predetermined size may be set as 200×200. As such, the spot is quickly calculated, determined, and identified.

Figure 7:
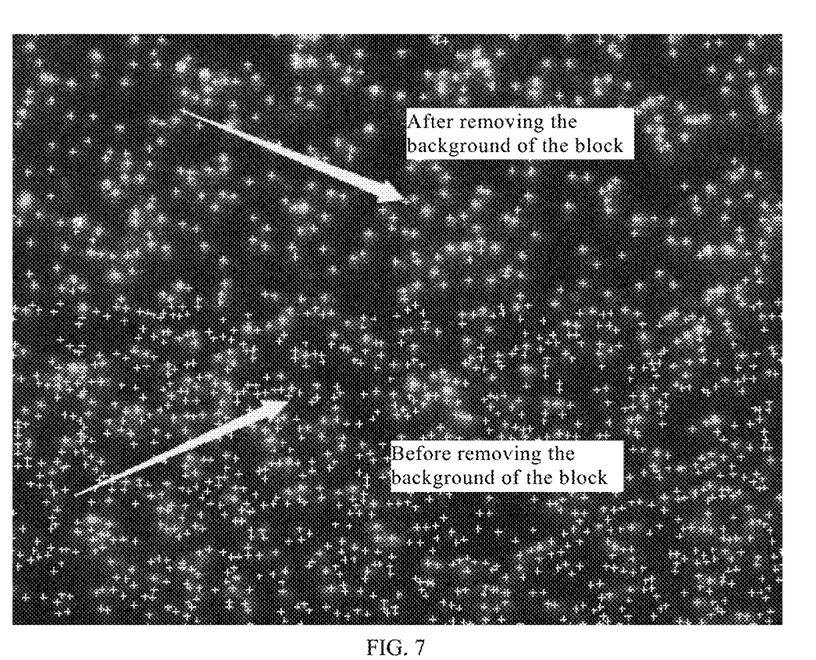
FIG. 7 is a schematic showing the comparison between spot detection results obtained before and after determination based on a second spot detection threshold according to a specific embodiment of the present disclosure.

In some embodiments, when determining a second spot detection threshold corresponding to the block, pixel values of pixels in each block are sorted in ascending order. The p10+(p10−p1)×4.1 is used as the second spot detection threshold corresponding to the block, i.e., a background of the block, where p1 represents the first percentile, and p10 represents the tenth percentile. The threshold is a relatively stable threshold determined by a large amount of data training, which can eliminate a majority of spots on the background. It can be understood that when an optical system is adjusted and overall pixel distribution of the image changes, the threshold may need appropriate adjustment. FIG. 7 is a schematic showing the comparison between spot detection results obtained before and after the processing, i.e. a schematic showing spot detection results before and after removing the background of a block. The upper half of FIG. 7 is the spot detection result after the processing, the lower half is the spot detection result before the processing, and the cross marks are candidate spots or spots.

Logic and/or steps shown in the flowcharts or described herein in other manners, for example, may be considered as a program list of executable instructions that are used to implement logical functions, and may be specifically implemented on any computer-readable storage medium, for an instruction execution system, device, or apparatus (for example, a computer-based system, a system including a processor, or another system that can fetch instructions from the instruction execution system, apparatus, or device and execute the instructions), or for a combination of the instruction execution system, device or apparatus. As used herein, the "computer-readable storage medium" may be any device that may include, store, communicate, propagate, or transmit a program for an instruction execution system, device, or apparatus, or for a combination of the instruction execution system, device, or apparatus. More specific examples (this list is not exhaustive) of the computer-readable storage medium include the following: an electrical connection (an electrical device) with one or more buses, a portable computer cartridge (an magnetic device), a random-access memory (RAM), a read-only memory (ROM), an erasable programmable read-only memory (EPROM or flash memory), an optical fiber device, and a portable compact disc read-only memory (CDROM). In addition, the computer-readable storage medium may even be a piece of paper on which the programs can be printed or any other appropriate media, because, for example, the paper or the media may be optically scanned, and the program may be electrically acquired by processing such as edition, decoding, or any other appropriate means when necessary and then stored in a computer storage.

Figure 8:
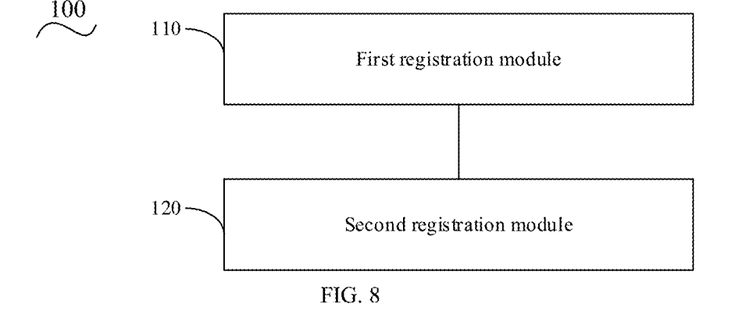
FIG. 8 is a schematic of a device for image registration according to a specific embodiment of the present disclosure.

In one embodiment of the present disclosure, as shown in FIG. 8, a device for image registration 100 is provided. The device is configured for implementing all or a part of the steps of the method for image registration in any of the above embodiments. The device 100 comprises: a first registration module 110 configured for performing a first registration for an image to be registered based on a reference image, comprising: determining a first offset between a predetermined region on the image to be registered and a corresponding predetermined region on the reference image, and moving all spots on the image to be registered based on the first offset to give an image to be registered having undergone the first registration, wherein the reference image and the image to be registered correspond to the same object and each comprise a plurality of spots; and a second registration module 120 configured for performing a second registration for the image to be registered having undergone the first registration from the first registration module based on the reference image, comprising: merging the image to be registered having undergone the first registration with the reference image to give a merging image, calculating an offset of all overlapped spots in a predetermined region on the merging image to determine a second offset, two or more spots distanced by less than a predetermined pixel being defined as one overlapped spot, and moving all spots on the image to be registered having undergone the first registration based on the second offset to register the image to be registered.

The above description of the technical features and advantages of the method for image registration in any of the embodiments of the present disclosure is also applicable to the device for image registration and will not be repeated hereinafter. It can be understood that additional technical features of the method for image registration in any of the above embodiments, including sub-steps, additional steps, and optional, alternative or better settings or processing can be implemented by allowing the device or modules of the device to further comprise units/modules or sub-units/sub-modules.

For example, in some examples, the device for image registration 100 further comprises a reference image construction module 109 configured for constructing a reference image, comprising: acquiring a first image and a second image corresponding to the same object as the image to be registered; performing a coarse registration for the second image based on the first image, comprising: determining an offset between the second image and the first image, and moving the second image based on the offset to give a second image having undergone the coarse registration; and merging the first image with the second image having undergone the coarse registration to give the reference image, wherein the first image and the second image each comprise a plurality of spots.

In some examples, constructing the reference image in the reference image construction module 109 further comprises utilizing a third image and a fourth image, wherein the image to be registered, the first image, the second image, the third image and the fourth image are acquired from the same field of view of a sequencing reaction, the first image, the second image, the third image and the fourth image respectively corresponding to fields of view during extension reactions of four bases A, T/U, G and C. A plurality of nucleic acid molecules with an optically detectable label are present in this field of view during the extension reactions of the bases, and at least part of the nucleic acid molecules are present as spots on the images. Constructing the reference image further comprises: performing a coarse registration for the third image based on the first image, comprising: determining an offset between the third image and the first image, and moving the third image based on the offset to give a third image having undergone the coarse registration; performing a coarse registration for the fourth image based on the first image, comprising: determining an offset between the fourth image and the first image, and moving the fourth image based on the offset to give a fourth image having undergone the coarse registration; and merging the first image with the second image having undergone the coarse registration, the third image having undergone the coarse registration and the fourth image having undergone the coarse registration to give the reference image.

In some examples, the reference image and the image to be registered are binary images.

In some examples, two-dimensional discrete Fourier transform is employed to determine the first offset, the offset between the second image and the first image, the offset between the third image and the first image and/or the offset between the fourth image and the first image.

In some examples, the device for image registration 100 further comprises a first spot detection module 107 configured for detecting spots for an image using k1×k2 matrices, determining that the matrix in which a center pixel value of the matrix is not less than any non-center pixel value of the matrix corresponds to a candidate spot, and determining whether the candidate spot is the spot, wherein both k1 and k2 are odd numbers greater than 1, and the matrix k1×k2 comprises k1×k2 pixels.

In some examples, the center pixel value of the matrix is greater than a first preset value, any non-center pixel value of the matrix is greater than a second preset value, and the first preset value and/or the second preset value are related to an average pixel value of the image.

In some examples, in the first spot detection module 107, determining whether a candidate spot is a spot comprises: calculating the size of a connected component corresponding to a candidate spot according to the equation Area=A×B, and determining the candidate spot with the size of corresponding connected component greater than a third preset value as the spot, wherein A represents the size of the pixel connectivity in a row where the center of a matrix corresponding to the candidate spot is located, B represents the size of the pixel connectivity in a column where the center of the matrix corresponding to the candidate spot is located, and a pixel connectivity greater than the average pixel value is defined as the connected component, and/or calculating score of a candidate spot according to the equation Score= ((k1×k2−1)CV−EV)/((CV+EV)/(k1×k2)), and determining the candidate spot with score greater than a fourth preset value as a spot, wherein CV represents the center pixel value of the matrix corresponding to the candidate spot, and EV represents the sum of the non-center pixel values of the matrix corresponding to the spot.

In some examples, the device for image registration 100 further comprises a second spot detection module 105, wherein the image to be registered or any image for constructing the reference image is acquired from a field of view of extension reactions of bases. A plurality of nucleic acid molecules with an optically detectable label are present in this field of view during the extension reactions of the bases, and at least part of the nucleic acid molecules are present as spots on the images. The second spot detection module 105 is configured for: preprocessing the image to give a preprocessed image; determining a critical value to simplify the preprocessed image so as to give a simplified image, comprising: assigning a first preset value to a pixel value of a pixel on the preprocessed image less than the critical value, and assigning a second preset value to a pixel value of a pixel on the preprocessed image not less than the critical value; determining a first spot detection threshold c1 based on the preprocessed image; identifying a candidate spot on the image based on the preprocessed image and the simplified image, comprising: determining a pixel matrix fulfilling at least two of the following conditions a)-c) as the candidate spot: a) in the preprocessed image, the center pixel of the pixel matrix has the maximum pixel value, the pixel matrix is represented by r1×r2, both r1 and r2 are odd numbers greater than 1, and the pixel matrix r1×r2 comprises r1×r2 pixels, b) in the simplified image, the pixel value of the center pixel of the pixel matrix is the second preset value, and the pixel connectivity in the pixel matrix is greater than $$\frac{2}{3} \times r1 \times r2,$$

and c) in the preprocessed image, the pixel value of the center pixel of the pixel matrix is greater than a third preset value, g1×g2 is >c1, g1 is a correlation coefficient of two-dimensional Gaussian distribution in an area of m1×m2 centered on the center pixel of the pixel matrix, g2 is a pixel matrix in the area of m1×m2, both m1 and m2 are odd numbers greater than 1, and the area of m1×m2 comprises m1×m2 pixels; and determining whether the candidate spot is the spot.

In some examples, in the second spot detection module 105, determining whether the candidate spot is the spot comprises: determining a second spot detection threshold based on the preprocessed image, and determining a candidate spot with a pixel value not less than the second spot detection threshold as a spot.

In some examples, the pixel value of the candidate spot is the pixel value of a pixel to which coordinates of the candidate spot correspond.

In some examples, in the second spot detection module 105, determining a second spot detection threshold based on the preprocessed image and determining a candidate spot with a pixel value not less than the second spot detection threshold as the spot comprises: dividing the preprocessed image into a set of blocks of a predetermined size, sorting pixels in the block by pixel value to determine the second spot detection threshold corresponding to the block, and determining a candidate spot in the block with a pixel value not less than the second spot detection threshold corresponding to the block as a spot.

In some examples, in the second spot detection module 105, preprocessing the image comprises: determining a background of the image using opening operation, converting the image into a first image based on the background using top-hat operation, performing Gaussian blur on the first image to give a second image; and sharpening the second image to give the preprocessed image.

In some examples, in the second spot detection module 105, determining a critical value to simplify the preprocessed image so as to give a simplified image comprises: determining a critical value based on the background and the preprocessed image, and comparing a pixel value of a pixel on the preprocessed image with the critical value so as to give a simplified image.

In some examples, in the second spot detection module 105, g2 is a corrected pixel matrix in the area of m1×m2, and the correction is performed based on the proportion of pixels with the second preset pixel value in the corresponding area of m1×m2 in the simplified image.

In some examples, in the first spot detection module 107 and/or the second spot detection module 105, determining whether the candidate spot is the spot further comprises: calculating sub-pixel center coordinates of the spot and/or intensity values of the sub-pixel center coordinates if the candidate spot is determined to be the spot, and discarding the candidate spot if the candidate spot is determined not to be the spot.

One embodiment of the present disclosure further provides a computer program product comprising an instruction that causes a computer to execute all or a part of the steps of the method for image registration in any of the above embodiments when the program is executed by the computer.

It will be appreciated by those skilled in the art know that, in addition to implementing the controller/processor in a form of computer-readable program code, same functions can be implemented in a form of a logic gate, a switch, an application-specific integrated circuit, an editable logic controller, an embedded microcontroller, and the like by logically programming the steps. Therefore, the controller/processor may be regarded as a hardware component, and a device included in the controller/processor for implementing various functions may also be regarded as a structure in the hardware component. Alternatively, a device for implementing various functions may be regarded as both a software module for implementing the method and a structure in the hardware component.

In the specification, descriptions such as "one embodiment", "some embodiments", "one or some specific embodiments", "one or some examples" or the like, mean that a particular feature, structure or characteristic described in reference to the embodiment or example is included in at least one embodiment or example of the present disclosure. In this specification, the schematic description of the aforementioned terms do not necessarily refer to the same embodiment or example. Moreover, the specific features, structures and other characteristics described may be combined in any one or more embodiments or examples in an appropriate manner.

Although the embodiments of the present disclosure have been illustrated and described, it can be understood by those of ordinary skill in the art that various changes, modifications, replacements and variations can be made to these embodiments without departing from the principle and purpose of the present disclosure, and the scope of the present disclosure is defined by the claims and equivalents thereof.

What is claimed is:

1. A method for image registration, comprising:
performing a first registration for an image to be registered based on a reference image, wherein the reference image and the image to be registered correspond to a same object and each comprise a plurality of spots, comprising:
determining a first offset between a predetermined region on the image to be registered and a corresponding predetermined region on the reference image, and moving all spots on the image to be registered based on the first offset to give an image to be registered having undergone the first registration; and
performing a second registration for the image to be registered having undergone the first registration based on the reference image, comprising:
merging the image to be registered having undergone the first registration with the reference image to give a merging image;
calculating an offset of all overlapped spots in a predetermined region on the merging image to determine a second offset, wherein two or more spots distanced by less than a predetermined pixel are defined as one overlapped spot; and
moving all spots on the image to be registered having undergone the first registration based on the second offset to register the image to be registered.

2. The method according to claim 1, wherein the reference image is acquired by construction, and constructing the reference image comprises:
acquiring a first image and a second image corresponding to the same object as the image to be registered;
performing a coarse registration for the second image based on the first image, comprising: determining an offset between the second image and the first image, and moving the second image based on the offset to give a second image having undergone the coarse registration; and
merging the first image with the second image having undergone the coarse registration to give the reference image, wherein the first image and the second image each comprise a plurality of spots.

3. The method according to claim 2, wherein constructing the reference image further comprises utilizing a third image and a fourth image, wherein the image to be registered, the first image, the second image, the third image and the fourth image are acquired from a same field of view of a sequencing reaction, the first image, the second image, the third image and the fourth image respectively corresponding to fields of view during extension reactions of four bases A, T/U, G and C; a plurality of nucleic acid molecules with an optically detectable label are present in the field of view during the extension reactions of the bases, and at least part of the nucleic acid molecules are present as the spots on the images; and constructing the reference image further comprises:
performing a coarse registration for the third image based on the first image, comprising: determining an offset between the third image and the first image, and moving the third image based on the offset to give a third image having undergone the coarse registration;
performing a coarse registration for the fourth image based on the first image, comprising: determining an offset between the fourth image and the first image, and moving the fourth image based on the offset to give a fourth image having undergone the coarse registration; and
merging the first image with the second image having undergone the coarse registration, the third image having undergone the coarse registration and the fourth image having undergone the coarse registration to give the reference image.

4. The method according to claim 1, wherein the reference image and the image to be registered are binary images.

5. The method according to claim 1, wherein two-dimensional discrete Fourier transform is employed to determine the first offset.

6. The method according to claim 1, further comprising identifying the spots, comprising: detecting an image using k1×k2 matrices, determining that a matrix in which a center pixel value of the matrix is not less than any non-center pixel value of the matrix corresponds to a candidate spot, and determining whether the candidate spot is the spot, wherein both k1 and k2 are odd numbers greater than 1, and the k1×k2 matrix comprises k1×k2 pixels.

7. The method according to claim 6, wherein the center pixel value of the matrix is greater than a first preset value, any non-center pixel value of the matrix is greater than a second preset value, and the first preset value and the second preset value are both greater than an average pixel value of the image.

8. The method according to claim 7, wherein determining whether the candidate spot is the spot comprises:
calculating a size of a connected component corresponding to a candidate spot according to an equation, Area=A×B, and determining the candidate spot with the size of corresponding connected component greater than a third preset value as the spot, wherein A represents a size of a pixel connectivity in a row where the center of a matrix corresponding to the candidate spot is located, B represents the size of the pixel connectivity in a column where the center of the matrix corresponding to the candidate spot is located, and a pixel connectivity greater than the average pixel value is defined as a connected component, and/or calculating a score of a candidate spot according to an equation, Score=((k1×k2−1)CV−EV)/((CV+EV)/(k1×k2)), and determining the candidate spot with score greater than a fourth preset value as the spot, wherein CV represents the center pixel value of the matrix corresponding to the candidate spot, and EV represents a sum of the non-center pixel values of the matrix corresponding to the spot.

9. The method according to claim 1, further comprising identifying the spots, wherein the images are acquired from a field of view of extension reactions of bases, a plurality of nucleic acid molecules with an optically detectable label are present in the field of view during the extension reactions of the bases, and at least part of the nucleic acid molecules are present as spots on the images, and the method comprises:
preprocessing the image to give a preprocessed image;
determining a critical value to simplify the preprocessed image so as to give a simplified image, comprising: assigning a first preset value to a pixel value of a pixel on the preprocessed image less than the critical value, and assigning a second preset value to a pixel value of a pixel on the preprocessed image not less than the critical value;
determining a first spot detection threshold c1 based on the preprocessed image;
identifying a candidate spot on the image based on the preprocessed image and the simplified image, comprising: determining a pixel matrix fulfilling at least two of the following conditions a)-c) as the candidate spot:
a) in the preprocessed image, a center pixel of the pixel matrix has a maximum pixel value, the pixel matrix is represented by r1×r2, both r1 and r2 are odd numbers greater than 1, and the pixel matrix r1×r2 comprises r1×r2 pixels;
b) in the simplified image, the pixel value of the center pixel of the pixel matrix is the second preset value, and a pixel connectivity of the pixel matrix is greater than $$\frac{2}{3} \times r1 \times r2,$$

and
c) in the preprocessed image, the pixel value of the center pixel of the pixel matrix is greater than a third preset value, g1×g2 is >c1, g1 is a correlation coefficient of two-dimensional Gaussian distribution in an area of m1×m2 centered on the center pixel of the pixel matrix, g2 is a pixel matrix in the area of m1×m2, both m1 and m2 are odd numbers greater than 1, and the area of m1×m2 comprises m1×m2 pixels; and determining whether the candidate spot is the spot.

10. The method according to claim 9, wherein determining whether the candidate spot is the spot comprises:
determining a second spot detection threshold based on the preprocessed image, and
determining the candidate spot with a pixel value not less than the second spot detection threshold as the spot.

11. The method according to claim 10, wherein the pixel value of the candidate spot is a pixel value of a pixel to which coordinates of the candidate spot correspond.

12. The method according to claim 10, wherein determining a second spot detection threshold based on the preprocessed image and determining the candidate spot with a pixel value not less than the second spot detection threshold as the spot comprises:

dividing the preprocessed image into a set of blocks of a predetermined size;
sorting pixels in the block by pixel value to determine the second spot detection threshold corresponding to the block; and
determining the candidate spot in the block with a pixel value not less than the second spot detection threshold corresponding to the block as the spot.

13. The method according to claim 9, wherein preprocessing the image comprises:
determining a background of the image using opening operation;
converting the image into a first image based on the background using top-hat operation;
performing Gaussian blur on the first image to give a second image; and
sharpening the second image to give the preprocessed image.

14. The method according to claim 13, wherein determining a critical value to simplify the preprocessed image so as to give a simplified image comprises:
determining the critical value based on the background and the preprocessed image; and
comparing a pixel value of a pixel on the preprocessed image with the critical value so as to give the simplified image.

15. The method according to claim 9, wherein g2 is a corrected pixel matrix in the area of m1×m2, and the correction is performed based on a proportion of pixels with the second preset pixel value in a corresponding area of m1×m2 in the simplified image.

16. A device for image registration, comprising:
a first registration module, configured for performing a first registration for an image to be registered based on a reference image, comprising:
determining a first offset between a predetermined region on the image to be registered and a corresponding predetermined region on the reference image, and moving all spots on the image to be registered based on the first offset to give an image to be registered having undergone the first registration, wherein the reference image and the image to be registered correspond to a same object and each comprise a plurality of spots; and
a second registration module, configured for performing a second registration for the image to be registered having undergone the first registration from the first registration module based on the reference image, comprising:
merging the image to be registered having undergone the first registration with the reference image to give a merging image;
calculating an offset of all overlapped spots in a predetermined region on the merging image to determine a second offset, wherein two or more spots distanced by less than a predetermined pixel are defined as one overlapped spot; and
moving all spots on the image to be registered having undergone the first registration based on the second offset to register the image to be registered.

17. The device according to claim 16, further comprising a reference image construction module configured for constructing the reference image, comprising:
acquiring a first image and a second image corresponding to the same object as the image to be registered;
performing a coarse registration for the second image based on the first image, comprising: determining an offset between the second image and the first image, and moving the second image based on the offset to give a second image having undergone the coarse registration; and merging the first image with the second image having undergone the coarse registration to give the reference image, wherein the first image and the second image each comprise a plurality of spots.

18. The device according to claim 17, wherein constructing the reference image in the reference image construction module further comprises utilizing a third image and a fourth image, wherein the image to be registered, the first image, the second image, the third image and the fourth image are acquired from a same field of view of a sequencing reaction, the first image, the second image, the third image and the fourth image respectively corresponding to fields of view during extension reactions of bases A, T/U, G and C; a plurality of nucleic acid molecules with an optically detectable label are present in the field of view during the extension reactions of the bases; and at least part of the nucleic acid molecules are present as the spots on the images; and constructing the reference image further comprises:

performing a coarse registration for the third image based on the first image, comprising: determining an offset between the third image and the first image, and moving the third image based on the offset to give a third image having undergone the coarse registration;

performing a coarse registration for the fourth image based on the first image, comprising: determining an offset between the fourth image and the first image, and moving the fourth image based on the offset to give a fourth image having undergone the coarse registration; and merging the first image with the second image having undergone the coarse registration, the third image having undergone the coarse registration and the fourth image having undergone the coarse registration to give the reference image.

19. The device according to claim 16, further comprising a spot detection module, wherein the images are acquired from a field of view of extension reactions of bases, a plurality of nucleic acid molecules with an optically detectable label are present in the field of view during the extension reactions of the bases, and at least part of the nucleic acid molecules are present as the spots on the images, and the module is configured for:

preprocessing the image to give a preprocessed image;

determining a critical value to simplify the preprocessed image so as to give a simplified image, comprising: assigning a first preset value to a pixel value of a pixel on the preprocessed image less than the critical value, and assigning a second preset value to a pixel value of a pixel on the preprocessed image not less than the critical value;

determining a first spot detection threshold c1 based on the preprocessed image;

identifying a candidate spot on the image based on the preprocessed image and the simplified image, comprising: determining a pixel matrix fulfilling at least two of the following conditions a)-c) as the candidate spot:

a) in the preprocessed image, a center pixel of the pixel matrix has a maximum pixel value, the pixel matrix is represented by r1×r2, both r1 and r2 are odd numbers greater than 1, and the pixel matrix r1×r2 comprises r1×r2 pixels;

b) in the simplified image, the pixel value of the center pixel of the pixel matrix is the second preset value, and a pixel connectivity of the pixel matrix is greater than $$\frac{2}{3} \times r1 \times r2,$$

and c) in the preprocessed image, the pixel value of the center pixel of the pixel matrix is greater than a third preset value, g1×g2 is >c1, g1 is a correlation coefficient of two-dimensional Gaussian distribution in an area of m1×m2 centered on the center pixel of the pixel matrix, g2 is a pixel matrix in the area of m1×m2, both m1 and m2 are odd numbers greater than 1, and the area of m1×m2 comprises m1×m2 pixels; and determining whether the candidate spot is the spot.

20. A non-transitory computer readable storage medium comprising a computer program comprising an instruction, wherein the instruction causes a computer to execute all of the steps of the method according to claim 1 when the computer program is executed by the computer.

* * * * *